H. KLECKLER.
AEROPLANE CONSTRUCTION.
APPLICATION FILED NOV. 16, 1917.
1,329,342.
Patented Jan. 27, 1920.
8 SHEETS—SHEET 1.
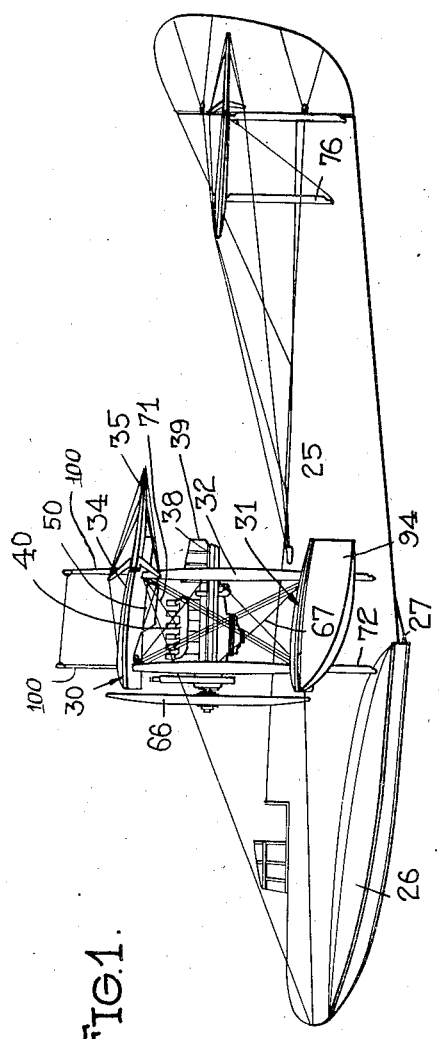
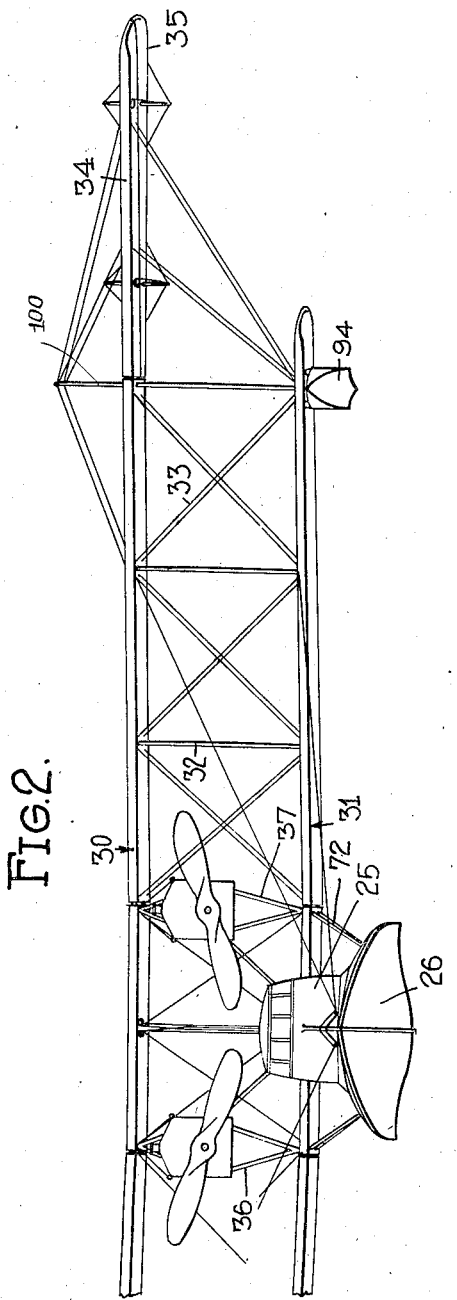
Inventor
HENRY KLECKLER.
Attorney

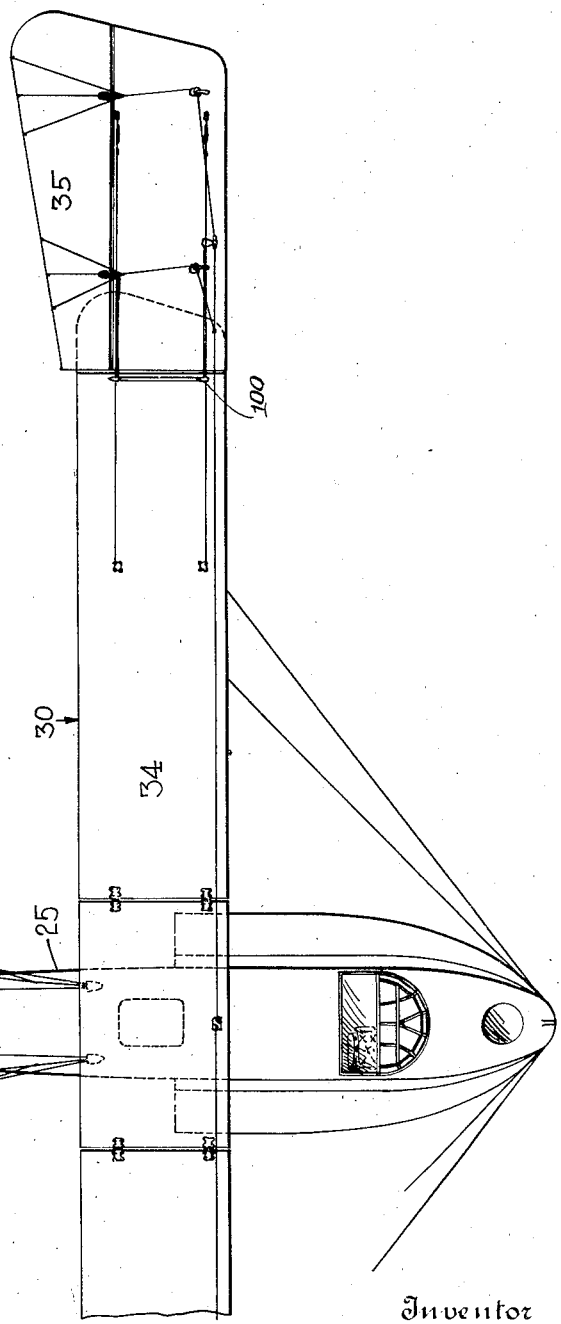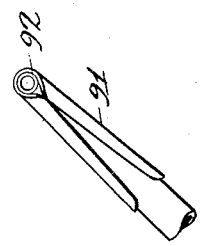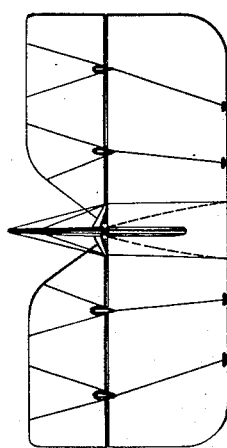

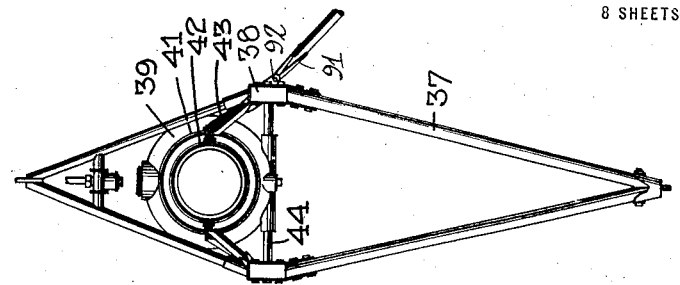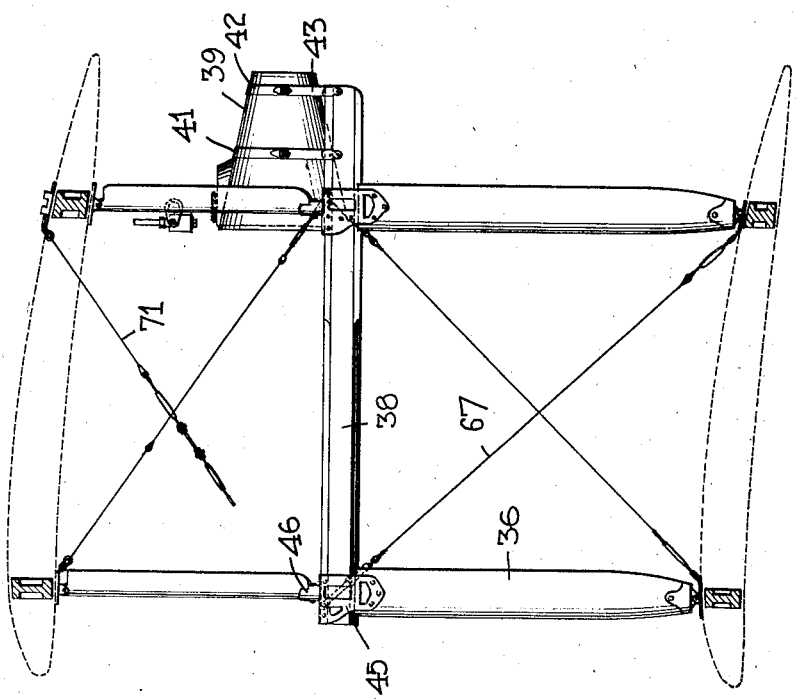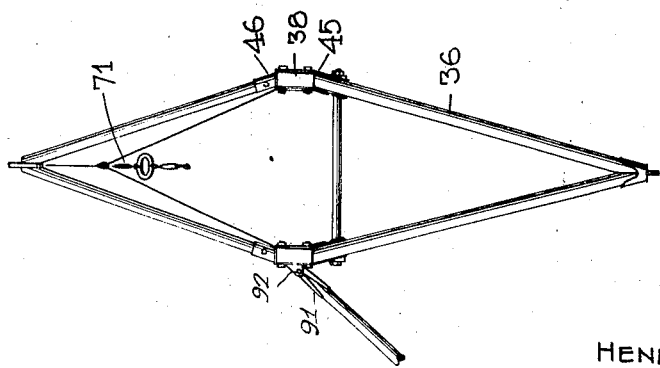

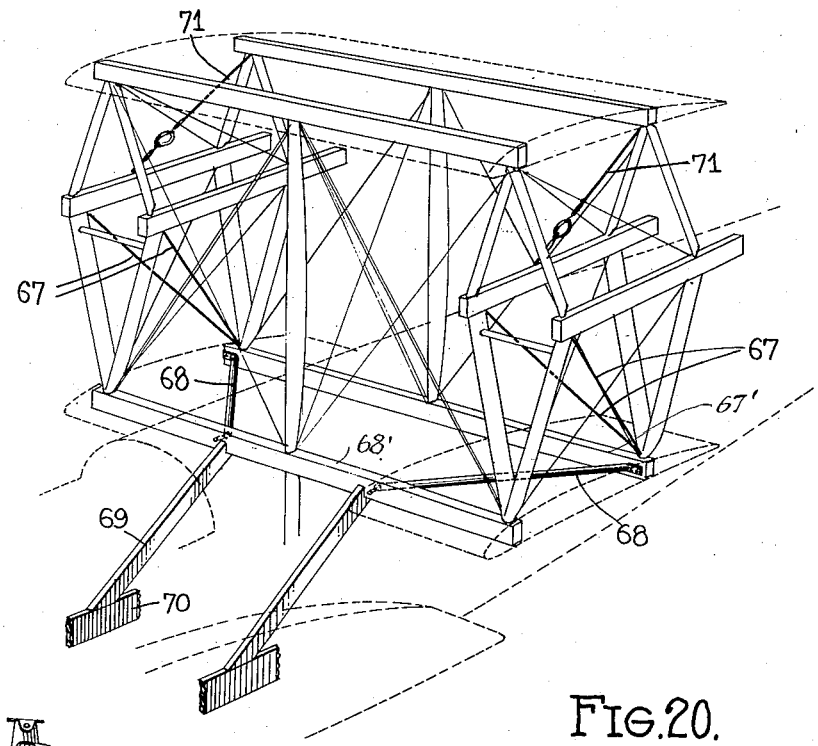
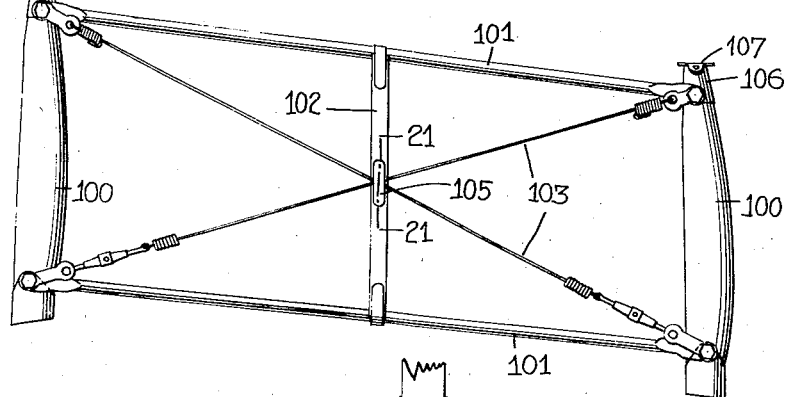
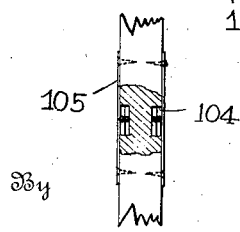

H. KLECKLER.
AEROPLANE CONSTRUCTION.
APPLICATION FILED NOV. 16, 1917.

1,329,342.

Patented Jan. 27, 1920.
8 SHEETS—SHEET 5.

Inventor
HENRY KLECKLER.
Attorney

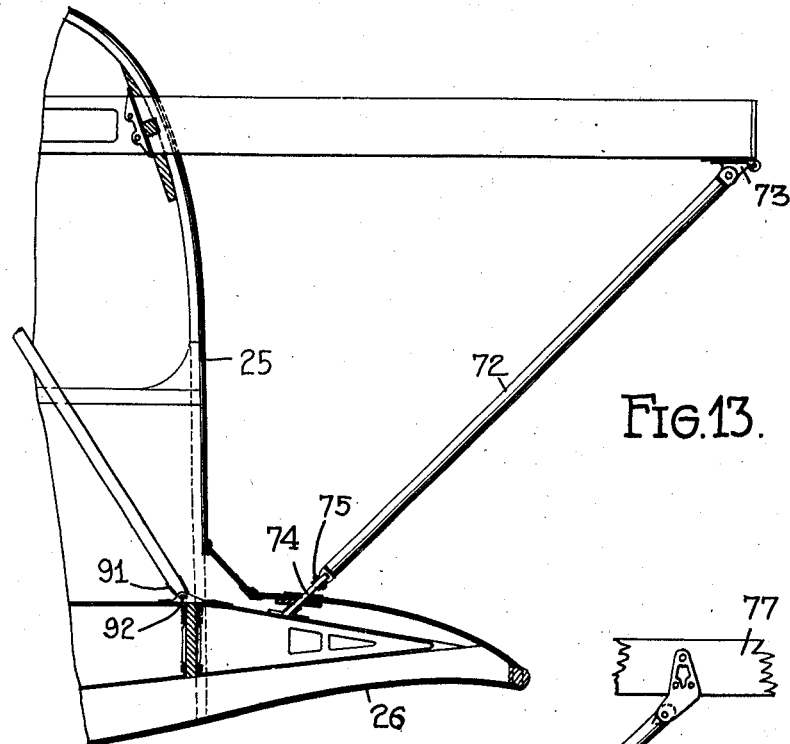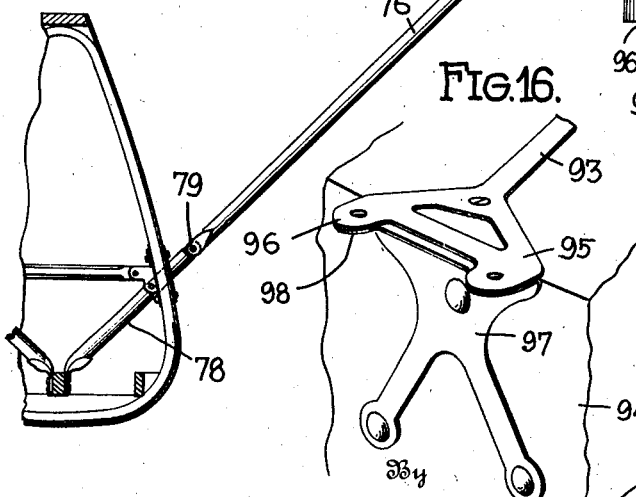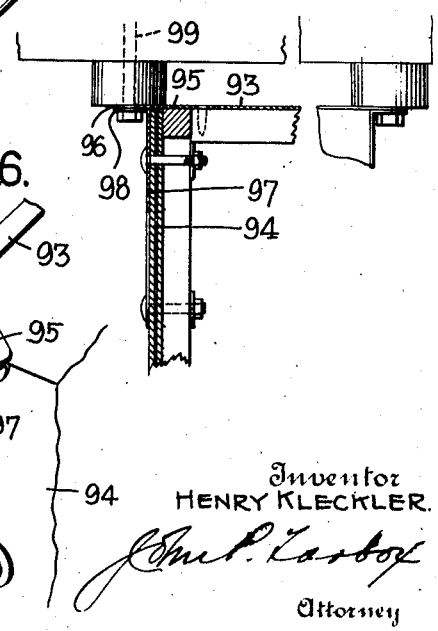

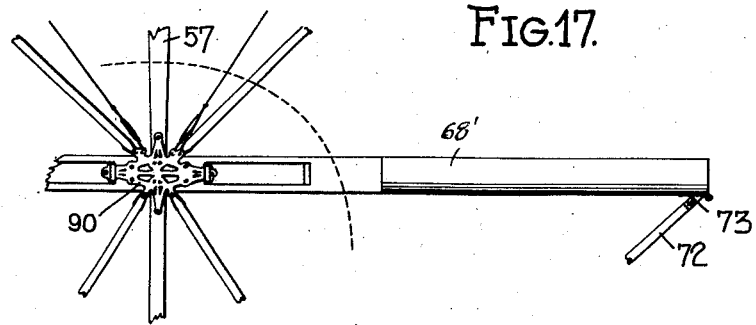
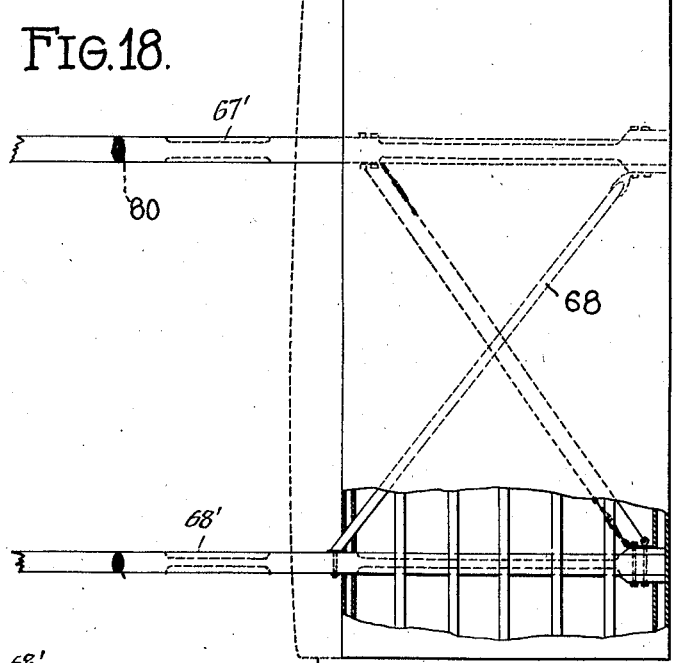
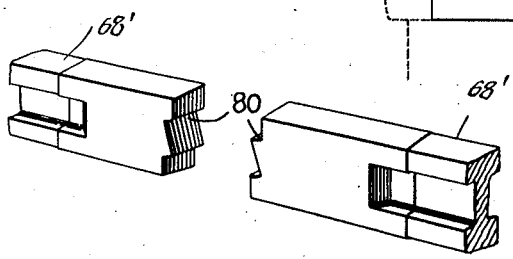

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

AEROPLANE CONSTRUCTION.

1,329,342.   Specification of Letters Patent.   Patented Jan. 27, 1920.

Application filed November 16, 1917. Serial No. 202,401.

*To all whom it may concern:*

Be it known that I, HENRY KLECKLER, citizen of the United States, residing at Buffalo, in the county of Erie and State of New York, have invented certain new and useful Improvements in Aeroplane Constructions, of which the following is a specification.

My invention relates to aircraft and more particularly to improvements in flying boat construction. The features of the invention are more or less detail and include an improved draft system whereby the motor thrust stresses are carried symmetrically into the hull in a manner affording a minimum of resistance to forward flight; an improved aileron and wing construction whereby the constructional features of the latter are simplified to a material extent, and improved details of construction such as appropriate anchorages for one or more of the various braces used in the construction of a flying boat together with improved means for fastening the end wing pontoons beneath the supporting surfaces after a fashion affording maximum strength and simplicity. Further characteristics of the invention, likewise of a detailed nature, will be hereinafter more particularly pointed out.

Figure 8:
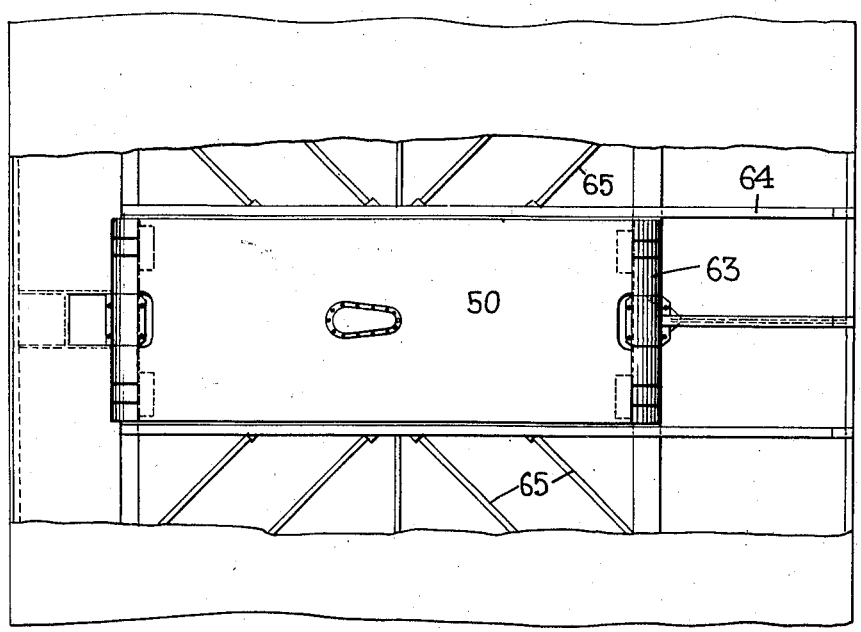
Figure 9:
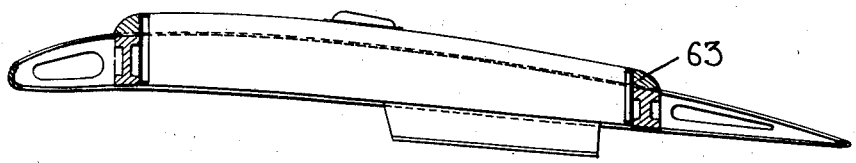

Of the drawings,

Figure 1 is a side elevation of an aircraft constructed in accordance with this invention, Fig. 2 is a front end elevation of the craft as illustrated in Fig. 1, a portion of the wing area being broken away, Fig. 3 is a top plan view of that portion of the machine illustrated in Fig. 2, Fig. 4 is a longitudinal vertical sectional view of the engine section, minus the hull, illustrating the wiring, the tank arrangement, engine bed mounting and relative arrangement of engine section parts, Fig. 5 is a front end elevation of one of the wing post frames, Fig. 6 is a rear end elevation of one of the wing post frames, Fig. 7 is a diagrammatic perspective view illustrating the draft system and the relative arrangement of both tension and compression members embodied in it, Fig. 8 is a top plan view of the engine section panel of the upper supporting surface showing the gravity tank mounting and placement, Fig. 9 is a view showing the wing panel of Fig. 8 in cross section with the gravity tank built in and supported by the wing beams of said panel.

Figure 10:
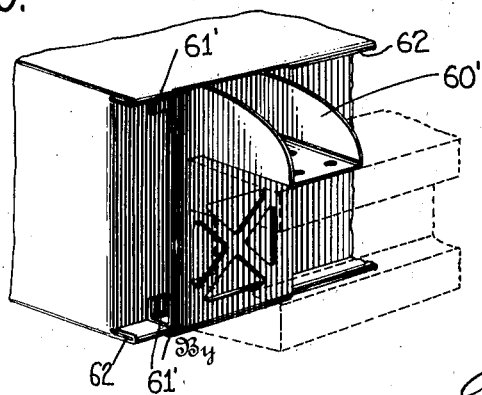
Figure 11:
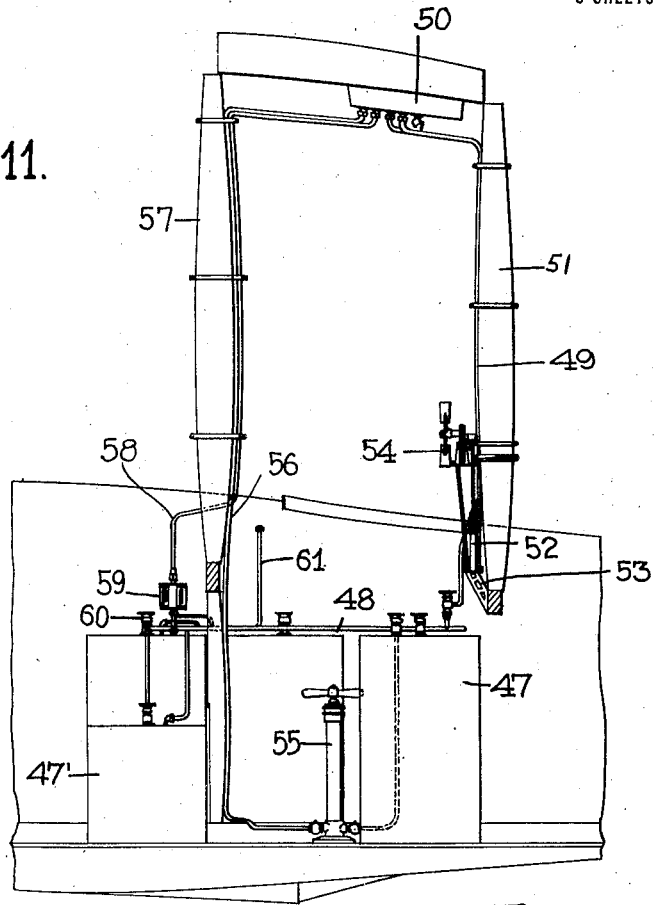
Figure 12:
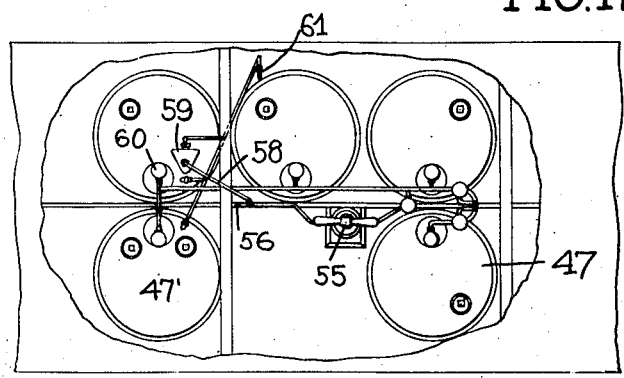

Fig. 10 is a detailed perspective view showing one of the gravity tank fittings or supports, Fig. 11 is a longitudinal vertical sectional view illustrating the relative arrangement of the parts constituting the fuel supply system, Fig. 12 is a plan view showing the arrangement of the fuel supply tank and piping, Fig. 13 is a transverse vertical sectional view of that portion of the hull traversed by one of the wing beams of the stub wing showing the manner in which the stub wing is braced; also the details of the brace anchorages.

Fig. 14 is a similar view taken at a point near the rear end of the hull showing the horizontal stabilizer brace and its anchorages, Fig. 15 is a detail transverse vertical sectional view, partly broken away, illustrating the details of the wing pontoon fastening, Fig. 16 is a detail perspective view of a portion of the fastening illustrated in Fig. 15, Fig. 17 is a fragmentary view illustrating the manner in which the alined sections of the stub wing beams are fastened, Fig. 18 is a plan view of one of the stub wings with a portion of its covering removed, Fig. 19 is a detail perspective view illustrating the interlock or rather the manner of interlocking the alined stub wing beam sections, Fig. 20 is a side elevation of the framing for one of the anti-skid planes, Fig. 21 is an enlarged section on the line 21—21 of Fig. 20, and Fig. 22 is a detailed view illustrating the type of fastening used in connection with several of the compression members or braces.

In its preferred embodiment the craft is characterized as follows; a longitudinally streamlined hull or body 25 is provided, the forward portion of which will be hereinafter referred to as the fore body of the hull and the rearward portion as the tail. Fins or excrescences 26 are arranged at opposite sides of the forebody for termination rearwardly at a step 27 placed approximately beneath the center of gravity of the craft designated C. G. These fins are also of longitudinal streamline formation and function primarily as a means for increasing the displacement as well as amplifying laterally the hydroplaning area of the hull bottom. The foregoing characteristics are more or less conventional and partake of the usual Curtiss flying boat construction. Hence they form no part of the invention herein claimed.

Directly above the step 27 supporting surfaces 30 and 31 are provided. These surfaces constitute a biplane cell and are interconnected preferably by wing posts 32 and wiring 33 as is usual. Each surface comprises a plurality of wing panels and since the upper surface has the greater spread it too has the greater number of panels. The outer panels of the upper surface extend beyond the ends of the lower surface and constitute overhangs and will be hereinafter referred to as the outer upper panels. These panels are designated as 34. In length the said panels 34 correspond with the ailerons or balancing surfaces 35. By constructing the ailerons and outer panels of equal length the necessity of providing a jog at the outer ends of the supporting surfaces is avoided, the work incident to the construction of the supporting surface frame work is simplified, and the manufacturing cost somewhat reduced by reason of the decreased time and labor required for construction.

The formation, or rather size, of the ailerons is such that the outer panels 34 are continued rearwardly in streamline form and the outer ends of the panels next adjacent the outer panels continued laterally. The aileron controls may be of any well known type.

At the engine section of the biplane cell wing post frames 36 and 37 are provided. These wing post frames are preferably of the mating V-type formation (diamond shape) and mounted at the outer ends of the engine section panels which are of corresponding length. Engine bed beams 38, two for each motor, are supported by said wing post frames intermediate the panels of the engine section and extend in parallelism. At their rearward end the beams continue beyond the rear wing post frames 37 to afford a bed or support for an oil tank 39. This tank is of substantially frusto-conical form (approximately streamline) with its base end mounted in close proximity to and at the rear end of the motor designated 40.

A tank 39 is of course provided for each motor.

The motors 40 are placed well forward of the engine beds and are fastened to them in any suitable manner. The fastening for the tanks 39 is the same in each instance. Said fastenings comprise bands 41 and 42 which completely encircle the tanks. Each band is made up of separable semi-circular sections bolted together and flanged at their extremities. Inwardly and upwardly inclined supports 43 engage with the flanged extremities of each band to support the tank in the position deemed most effective as streamlined prolongations of the motors. Cross braces 44, one for each tank, let partly into the bottom thereof, also function as supports for the tanks. The location of these braces 44 is such that the engine bed beams 38 are cross-braced in the plane of the rear wing post frame 37 and the tanks supported at their enlarged or forward ends. The details of the mounting and the arrangement of the tanks is best illustrated in Figs. 4 and 6.

As indicated, the wing post frames 36 and 37 comprise mating V-struts (the upper one of which is inverted). Instead of carrying the lap joint fittings for these frames over and beyond the edges of the engine bed beams for connection with the mating struts as heretofore the fittings are now constructed of an inverted U-form. The beams 38 engage between the legs of the fitting which are of sufficient length to extend beyond the bottom edges of the beams for connection with the upper extremities of the V-struts. The bight portion of each fitting is equipped with an integral socket within which the lower extremities of the inverted V-struts are seated. The fittings as an entirety are designated as 45 and the sockets integrally formed upon them as 46.

As in most machines of the flying boat type the fuel supply tanks (of which there are five in the present instance) are located within the hull or body symmetrical or nearly symmetrical to a line passing vertically through the center of gravity of the machine. In this way the variable load is properly distributed. All of the supply tanks are designated as 47 and connected by a manifold pipe 48. Two supply pipes 49 connect the manifold pipe 48 to the gravity tank 50 mounted in the center panel of the upper supporting surface. These pipes 49 extend in parallelism and for the major portion of their length follow the rear center wing post 51 of the wing structure. Two supply pipes are used for the purpose of continuing the supply of fuel to the gravity tank should one of the supply connections be shot away or otherwise rendered useless. Separate fan driven pumps 52 are interpolated in the supply connections 49 for an obvious purpose. The pumps are independently acting and supported preferably at the foot of the rear center strut 51 upon a suitable bracket 53 mounted within the hull with the fans 54 extended above the hull deck into the path of air rush during flight.

As a further emergency means a hand pump 55 is provided. This pump is connected as at 56 with the gravity tank 50. The pipe connection follows the front center wing post 51. Access may be gained to the hand pump 55 from the fore part of the hull. For this reason one of the tanks designated as 47', is made smaller than the rest.

The capacity of each pump is somewhat greater than the demand of the motors. To carry off this excess fuel supply a return pipe 58 is provided. This pipe, like the pipe connection 56 follows the front center wing post 57 to the interior of the hull and thence extends forwardly. A sight gage 59 is interpolated in the forwardly extended portion of said return pipe to indicate to the pilot or mechanician whether or not the fuel supply system is in running order. If for any reason the fuel supply should be discontinued this fact is immediately made known to the mechanician by reference to the sight gage 59. Moreover, the sight gage acts as a means for indicating when the flying radius limit of the craft shall have been reached. The fuel supply may be drawn from any one of the fuel supply tanks or from the several tanks collectively. Valves 60 are provided for this purpose. The pipe connection indicated at 61 is nothing more than a vent.

The big advantage of a fuel supply system of the type disclosed is that the unnecessary net work of pipes and connections heretofore existing is almost completely eliminated and instead but a single manifold pipe installed. By doubling up the number of fan pumps and pipe lines a double factor of safety is provided—in fact a triple factor if the hand pump pipe connection be included. The supply of fuel in excess of the motor demand is advantageous in that an adequate supply is at all times insured and the use of a sight gage in the overflow or return pipe permitted. Such an arrangement is far better and much more positive as an indicating means than the old method of equipping each tank with a separate and independently acting gage.

The gravity tank mounting and construction is best illustrated in Figs. 8, 9 and 10. The size of this tank should vary with the spacing of the wing beams of the upper wing or supporting surface for it is preferred that the wing beams support the tank. In Fig. 9 it will be noted that a portion of the tank is extended above the top surface of the center panel of the upper wing into the vacuum space created by this wing when the craft is in flight. The bottom surface of the tank should be cambered according to the underneath surface of the wing so as not to decrease its efficiency. In other words it is proposed to increase the tank area or capacity by utilizing a portion of the vacuum space above the wing. The mounting for the tank comprises fittings 60' having flanges 61' which engage with flanges 62 formed respectively upon the top and bottom edges of the tank at the front and rear thereof. The shape of the fitting is such that a portion of it is extended over the wing beams to rest upon them. Fillers 63 are placed at the top, front and rear edges of the tank to terminate abrupt surfaces. The wing itself is strengthened by the gravity tank placement within its confines. The center ribs of the panel are spaced and the tank fitted between them and diagonal ribs provided to intermediately brace them. The ribs have been designated 64 and the diagonals 65. In other words it is proposed to utilize the gravity tank as a structural element of the wing and so construct it that the head resistance will be decreased proportionately. Heretofore the gravity tank has been either inclosed entirely within the wing or located beneath it; both of which arrangements are objectionable; the former for the reason that the capacity of the tank must be necessarily small and the latter for the reason that its placement adds considerable resistance or drag.

In the design of the draft system herein disclosed every consideration has been given the placement of the various elements in order that the head resistance might be minimized and all essential elements inclosed where practicable in such necessarily exposed aeroplane parts as the wings or supporting surfaces. The motors 40 it will be noted are located forwardly of the engine bed to extend beyond the transverse vertical plane of the forward wing post frames. This placement of the motors is desirable in that the propellers (two, of the tractor type) 66 have a field of operation directly in advance of the supporting surfaces and symmetrically at opposite sides of the hull or body. From beneath the forward end of the motors cables 67 extend convergently rearwardly and downwardly for connection with the rear wing beam 67' of the alined stub wings at the foot of the rear wing post frames 37. These cables directly take up the thrust effort of the motors and carry the thrust stresses to the rear stub wing beam from which point distribution is effected. Braces 68 extend forwardly and inwardly, in converging relation from the rear wing beam 67' to the front wing beam 68' at or near points in the plane of the sides of the hull. These braces are inclosed within the stub wings and during operation of the motors are under compression because of their placement at the points where the cables 67 connect with the upper wing beam of the stub wing. From the braces 68 the draft or thrust is carried forwardly and downwardly in the vertical plane of the sides of the hull to the chine stringers themselves. The forwardly and downwardly inclined braces for this purpose have been designated 69 and the chine stringers 70. The arrangement of the various elements thus correlated is best illustrated in Fig. 7. Moreover, cables 71 are provided as an auxiliary element of the draft system. These cables extend upwardly and rearwardly from the forward ends of the motors for connection with the rear wing beam of the upper panel of the engine section. In this way a more uniform distribution of thrust stresses is effected throughout the wing structure. The converging cables 67 beneath the motors connect with the engine bed beams at their forward ends and the cables 71 direct with the motors. All cables are under tension. Stub wings may or may not be provided although in view of the motor arrangement and location such wing construction is preferred. The beams of the stub wings penetrate the hull and may be described as an integral part of it by reason of their intimate connection with the various interior elements of the hull. In Fig. 13 an improved type of stub wing bracing is shown. It will be noted that the stub wings extend out laterally beyond the hull sides directly above the rearward terminations of the fins. Because of this fin construction it is convenient to interbrace the two, i. e., the stub wings and fins. In construction the bracing may be described as comprising a diagonal brace 72, a fitting 73 mounted upon the under side of the stub wing at its outer end and a fitting 74 mounted at the foot of the brace. This latter fitting is of a novel construction in that its formation is such that the brace 72 can be and is fastened to it as at 75 from the exterior of the hull body and without necessitating a removal of the inclosed fastening means provided for the fitting itself. Ordinarily braces of this character are let through the sides or walls of the body with which they are connected and fastened interiorly which is objectionable because of the inconvenience attendant upon the substitution of one brace for another, an expedient of relative frequency where craft are handled without care. This same type of brace is shown in Fig. 14. In this figure, however, the brace designated 76, interconnects the horizontal stabilizing fin or surface 77 with an anchorage 78 fastened interiorly of the tail of the hull to one of the structural elements thereof and is let through the hull side for connection as at 79 with the brace. In both cases the idea is identical. In fact it is immaterial where the brace is located or what element or elements of the craft are braced. The idea of novelty is the termination of the brace without the confines of the body for connection with an anchorage let through the sides of the body for interior connection with one of the structural elements thereof.

Another feature of the wing construction worthy of note is the stub wing beam connection with the hull or body. It will be observed that the beams 67' and 68' are of equal length and that each is made up of separable sections. The sections of the beams abut and are terminally shouldered as at 80 to provide an interlock. In other words, the meeting or abutting ends of the beam section are complemental and locked (in the longitudinal vertical plane of the keel line) against relative displacement. A fitting 90 is provided as a further connection between the beam sections and also as a connection for a number of braces which concentrate at this point. These braces and a number of the remaining braces used in the construction of the boat are provided with an improved type of anchorage of extremely simple and compact form. The braces being constructed of metal tubing and many of them pivoted at their extremities a simple but strong pivot joint or connection is needed. This pivot connection (see Figs. 5, 6 and 22, the latter particularly) comprises a metal strip 91 bent upon itself or rather into U-shape to receive in its bight or between the extensions a pivot pin 92 held rigid with that part of the craft with which the brace connects by any suitable means. The ends of the strap or U-shaped member after receiving between them the pivot pin 92 are welded to the end of the brace.

In Figs. 15 and 16 an improved type of pontoon fastening or fitting is disclosed. This fitting is designed with a view to lightness and strength. It comprises a deck tie strap 93 of a length sufficient to extend beyond the opposite longitudinal edges of the pontoon 94. The ends of the strap are enlarged as at 95 and provided with ears 96. Beneath the extended portions of the tie strap side plates or fittings 97 are disposed. These fittings are also provided with ears 98 which underlie the ears 96 of the tie strap to form with said ears flanges through which the fastening bolts 99 extend. The side plates 97 extend over a comparatively large area of the pontoon sides to appropriately distribute the impact strains over a wide area of the pontoon. The tie strap 93 serves as a cross brace for the pontoon and at the same time as a reinforcing means for the pontoon fastening.

The anti skid planes of the machine likewise possess detailed features of novelty.

The frames for these planes each comprise end struts 100 connected by braces 101 at the top and bottom of the struts. Intermediately the braces 101 are cross-braced as at 102 and the frame in its entirety cross-braced by wires 103. The cross-brace 102 is notched as at 104 to receive the cross wires 103 (see Fig. 21). Retaining plates 105 are provided for holding the crossed wires in place. The antiskid planes are also provided with sockets 106 having ears 107 formed upon them. The sockets 106 receive the upper extremities of the posts 100 and the ears 107 afford anchorages for wires 108 which brace the overhangs.

All of the various detail features above described except possibly the details of the hull *per se* are equally as serviceable and adaptable to aircraft construction (land machines) as to flying boats. Their use in connection with the flying boat is merely illustrative. The draft system is especially adaptable to multiple motored craft although the fuel supply system is not so limited. In any event, however, no limitations to the particular uses described are intended except in so far as the claims compel. The features of the craft not detailed and not described, such as pontoon construction, fin construction, etc., constitute separate applications already filed. This case is intended to cover only the various details of construction of the improved "Curtiss" flying boat.

What is claimed is:

1. In an aircraft, supporting surfaces, a motor unit mounted intermediate the supporting surfaces, engine-bed-beams for supporting the motor unit, the beams at one end extending beyond the corresponding end of the motor, a tank mounted upon the extended end of the engine bed to provide a substantially streamlined prolongation of the motor, means for fastening the tank to the engine-bed, and a connection between the tank and motor.

2. In an aircraft, supporting surfaces, a motor unit mounted intermediate the supporting surfaces, engine-bed-beams for supporting the motor unit, a tank mounted at the rear of the motor unit in streamlined prolongation thereof, and a connection between the respective engine-bed-beams of a construction such that it provides a support for the tank.

3. In an aircraft, supporting surfaces, a motor unit mounted intermediate the supporting surfaces, engine bed beams for supporting the motor unit, a tank mounted to the rear of the motor, the shape of the tank being such that it provides in effect a substantially streamline prolongation of the motor, means for supporting the tank in its elevated position behind the motor, and a connection between the tank and motor.

4. In an aircraft, supporting surfaces, an engine-bed mounted intermediate the supporting surfaces, divided wing-posts for supporting the engine-bed and interconnecting the supporting surfaces, and a fitting of substantially inverted U-form having its bight portion in engagement with the engine-bed and its extremities extended therebeyond for engagement with one of the wing-post-sections, said bight portion being provided with a socket member within which one end of the other of said wing-post-sections is fitted.

5. In an aircraft, supporting surfaces, a motor unit mounted intermediate the supporting surfaces, a body, and a draft system comprising tension means extending downwardly and rearwardly from the motor unit to the lower supporting surface together with compression means connecting with the tension means and extending forwardly at an angle into the body.

6. In an aircraft, supporting surfaces, motor units mounted intermediate the supporting surfaces symmetrically at opposite sides of the craft, a body, tension means extending downwardly and rearwardly from the respective motor units, and compression means arranged to continue the thrust stresses laterally inwardly into the body.

7. In an aircraft, supporting surfaces, motor units mounted intermediate the supporting surfaces symmetrically at opposite sides of the craft, a body, and a draft system comprising means extending downwardly from the respective motor units and thence inwardly by way of the lower supporting surface for connection within the body.

8. In an aircraft, supporting surfaces, a motor unit mounted intermediate the supporting surfaces, a body, and a draft system comprising means extending convergently downwardly and rearwardly from the forward end of the motor unit together with means for continuing the transmission of thrust stresses into the body.

9. In an aircraft, supporting surfaces, motor units mounted intermediate the supporting surfaces, a body, and a draft system comprising tension means extending downwardly and rearwardly from each motor unit, compression means extending forwardly and inwardly from the tension means, and braces located in the planes of the sides of the body for carrying the thrust stresses into the body, the compression means and the braces being inclosed and removed from view.

10. A draft system for multi-motor flying boats including cables extending downwardly and rearwardly from the motor units, compression members extending inwardly and forwardly from the lower ends of the cables, and braces extending downwardly and forwardly from the inner ends of the compression members, the braces being inclosed in the body of the machine and so related thereto that the thrust stresses are distributed from a substantial portion of the area thereof.

11. In an aircraft, the combination with an inclosed body, of a laterally extending aerofoil surface, brace means for said surface, an anchorage extended through the outer covering of the body, the inner end of the anchorage being rigidly fastened to a structural element of the body, and a separable connection between the outer end of the anchorage and the brace.

12. In an aircraft, the combination with an inclosed body, of a laterally extending aerofoil surface, a brace for the aerofoil surface, an anchorage extended through the outer covering of the body, a connection between the inner end of the anchorage and one of the structural elements of the body, and a separable connection between the outer end of the anchorage and the brace.

13. In an aircraft, a stub-wing panel, a body, a wing beam for rigidly supporting the stub-wing panel extended into the body, and a brace for the wing-beam extended diagonally inwardly from the outer end thereof to the interior of the body, said brace throughout its full length being inclosed within the confines of the stub-wing panel.

14. In an aircraft, a supporting surface, a transversely divided wing-beam for rigidly supporting said surface, a body, the adjacent ends of the wing-beam-sections being inclosed within said body, and abutting shoulders formed on said beam-section-ends to provide an interlock.

In testimony whereof I hereunto affix my signature.

HENRY KLECKLER.